July 13, 1965 M. MANDEL 3,194,987
CONTROL CIRCUIT UTILIZING AVALANCHE CHARACTERISTIC DEVICES
HAVING DIFFERENT MINIMUM HOLDING CURRENT
Filed Feb. 4, 1963

INVENTOR.
MARK MANDEL
BY Edward Goldberg
ATTORNEY 3,194,987

CONTROL CIRCUIT UTILIZING AVALANCHE CHARACTERISTIC DEVICES HAVING DIFFERENT MINIMUM HOLDING CURRENT

Mark Mandel, West Orange, N.J., assignor to International Telephone and Telegraph Corporation, Nutley, N.J., a corporation of Maryland Filed Feb. 4, 1963, Ser. No. 255,868
12 Claims. (Cl. 307—88.5)

This invention relates to control circuits and particularly to a novel pulse circuit of improved reliability which utilizes a semiconductor switching device having an avalanche type characteristic.

In aircraft systems such as distance measuring equipment, it is extremely important to have a highly reliable switching circuit. A distance measuring system presently employed, detects a predetermined pulse relationship between transmitted pulses from the aircraft and reply pulses from a ground station. A coincidence circuit then triggers the control circuit which actuates a relay and servo-motor to stop a searching operation and start tracking on the desired pulse pattern. The time between the outgoing and incoming pulses determines the aircraft distance. Generally, this equipment has made use of vacuum tube and thyratron switching circuits which are relatively complex, bulky, and have large power requirements. An example of such apparatus may be found in "Electronic Avigation Engineering," 1958 edition, pages 467-473, by Peter C. Sandretto. Circuits to miniaturize these functions using semiconductor devices have had difficulties as a result of changing environmental conditions, aging of components, transient pulses and drifting power supply voltages, which cause unreliable operation.

It is therefore an object of the present invention to provide a simple sensitive semiconductor switching and control circuit of improved reliability and efficiency.

This effect is achieved by use of a novel combination of a silicon controlled rectifier and four-layer diode arranged in series, wherein the voltage rating and current extinguishing characteristics of the diode and sensitive firing capability of the controlled rectifier are used to reliably turn off a pulse forming circuit which actuates the utilization device. The details of the invention will be more fully understood and other objects and advantages will become apparent in the following description and accompanying drawings, wherein.

Figure 1:
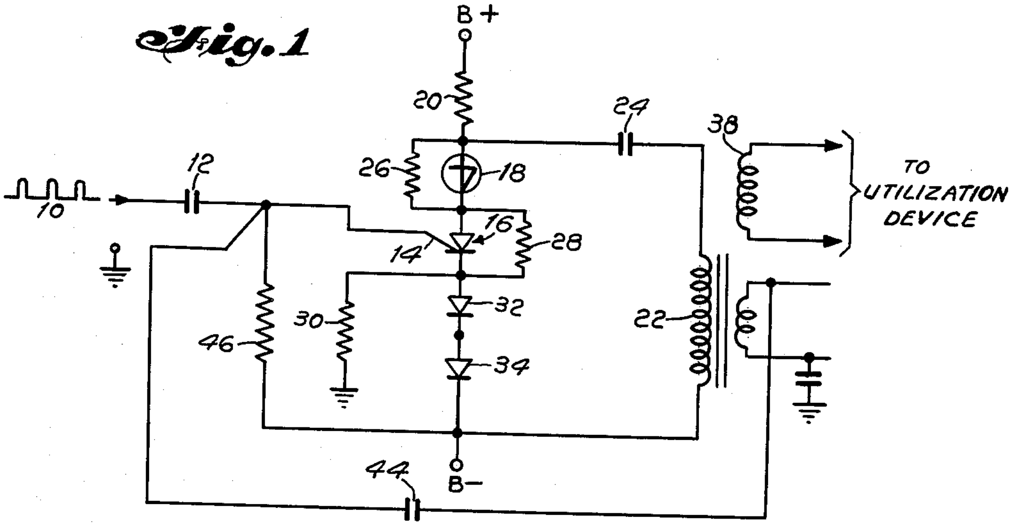
FIGURE 1 is a schematic representation of the novel circuit.
Figure 2:
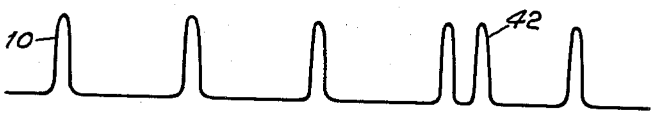
FIGURE 2 shows a train of input pulses which triggers the circuit.

As shown in FIGURES 1 and 2, signal input pulses 10 are fed through a coupling capacitor 12 into the trigger or gating electrode 14 of a suitable silicon controlled rectifier 16. In series with controlled rectifier 16 and the direct voltage supply is a two-terminal four-layer diode 18 of a known PNPN type. An inherent characteristic exhibited by both the controlled rectifier and four layer diode is that of the avalanche effect, wherein a predetermined signal level exceeding the rated anode-emitter breakdown voltage causes the device to conduct. For the controlled rectifier and the avalanche effect will be produced at lower anode-emitter voltages by introducing a suitable trigger on the gate control element. This conduction or "on" condition will continue unaffected by further input pulses until a required small anode holding current is reduced below a rated minimum value to extinguish the device. The holding current of the four-layer diode may readily be selected substantially higher than that of the sensitively triggered controlled rectifier so that the diode may more easily attain the "off" condition.

The diode current is primarily limited by use of a relatively small series anode resistor 20, operating in conjunction with a pulse forming or ringing circuit. The latter circuit comprises the inductance of primary transformer winding 22 and the reactance of capacitor 24 connected to diode 18 to form a charge path through resistor 20 from the B+ direct voltage source, with the serially arranged controlled rectifier 16 and four-layer diode 18 forming a low impedance discharge path during each conduction cycle. The capacitor 24 is charged to the direct voltage potential which is applied across the series diode and controlled rectifier circuit.

Figure 4:
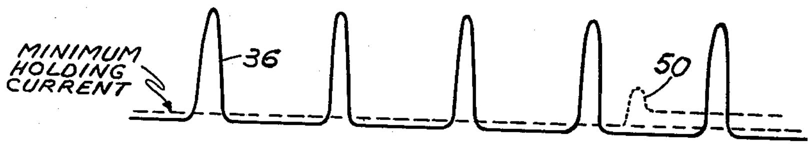
FIGURE 4 shows a corresponding current waveform.

The ringing circuit tends to produce an oscillatory exchange of energy between capacitor 24 and the inductance of transformer winding 22. Current through diode 18 and rectifier 16, however, flows only in the direction toward the B— negative supply terminal. The ringing circuit current reaches a maximum value, as shown in FIGURE 4, which is determined by the voltage between the anode of diode 18 and the negative supply terminal, the values of the reactance of capacitor 24 and inductance 22, and the resistance of the series path including the effective resistance of the avalanche devices. The current then decreases from the maximum until it reaches a value slightly below the holding current of the four-layer diode, whereupon the "off" condition is realized.

Without use of the four-layer diode, the sensitive controlled rectifier would require a substantially larger series resistor to attain an inherent smaller holding current. However, a large value resistor is undesirable due to high pulse repetition frequency requirements wherein the capacitor cannot be charged with sufficient rapidity to attain a desired voltage amplitude. Therefore, a resistor value that does not limit the holding current below its extinguishing level would have to be used. The ringing circuit without diode 18 would then be subject to unreliable operation under varying circuit conditions or random pulses which can result in a defective steady-state "on" condition for the more easily affected controlled rectifier switch.

This condition may occur, for example, if capacitor 24 is not fully charged to the B+ supply voltage before firing of the sensitive controlled rectifier so that the current amplitude through the ringing circuit does not reach the maximum. If the amplitude is sufficiently decreased, the negative going pulse portion will not reach the required value of holding current to reliably turn off the controlled rectifier. Such operation may result when a second input pulse is applied sufficiently close to a first pulse, or by another condition causing premature firing of the sensitive controlled rectifier, thus preventing capacitor 24 from charging to the full positive supply voltage before the second firing. Since turn-off by the ringing circuit is not effected, the control rectifier remains "on." The next input pulse will then either be loaded down by the input circuit of the conducting controlled recitifier and thereby be ineffective or may cause the rectifier to conduct more heavily during occurrence of the second pulse. In either case the ringing circuit will not reach the holding current required for turn-off and a steady state "on" condition will result.

The addition of the four-layer diode in series with the controlled rectifier permits use of the charging circuit in combination with a relatively small limiting resistor to provide the desired reliability and self-extinguishing operation. As previously noted, the four-layer diode is chosen with a holding current substantially higher than that of the sensitive rectifier. A smaller value of resistor 20 will then be needed to limit the series circuit current to the four-layer diode holding current value. In some cases this resistor value will satisfy both the high pulse frequency requirements of the circuit as well as the current limiting function so that the ringing circuit, whose primary function is to provide a definite sharp current reduction is then unnecessary. In such a case the transformer may be replaced by a resistor as will be discussed hereinafter.

Where frequency and current limiting action requires the ringing circuit, addition of the four-layer diode will ensure more reliable operation thereof to turn off the sensitive controlled rectifier. Thus the series current flow path through the sensitive control rectifier is completed only when the voltage across the four-layer diode 18 exceeds its characteristic breakdown voltage. This effect establishes a minimum required voltage across capacitor 24 at which conduction may occur. If the four-layer diode is chosen so that conduction will occur only when sufficient voltage across the series circuit is available, then a sufficient ringing circuit current is determined which enhances the reliability of turn off of the controlled rectifier. Effectively, addition of the four-layer diode to the circuit introduces a period during which input pulses will not cause undesired conduction.

In the present arrangement the current in the anode circuit of the four-layer diode 18 is normally maintained below the minimum holding current so that the series circuit is in an "off" condition. Resistors 20, 26, 28 and 30 form a divider network across the direct voltage supply to provide stabilized operating voltages and predetermined currents for diode 18 and rectifier 16. Thus, small resistor 20 and relatively large resistors 26 and 28, respectively, limit the anode current of each switch element. Unidirectional diodes 32 and 34 of a common two-layer type form a well-known threshold or noise limiting circuit in series with the controlled rectifier, wherein input pulses must reach a particular small signal level with respect to ground before conduction can occur. Resistor 30 also serves to establish the bias on these noise limiters.

Figure 3:
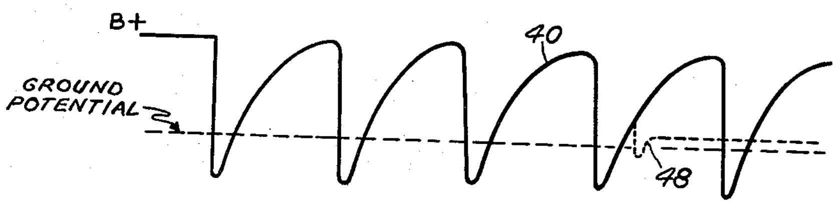
FIGURE 3 shows a resultant voltage waveform of the device.

Occurrence of input pulses 10, which may represent ground station reply pulses, of sufficient amplitude at input electrode 14, causes controlled rectifier 16 to conduct instantaneously and momentarily lowers the voltage across that element. Thus, a larger potential from the junction of diode 18 and charged capacitor 24 equal to the direct voltage supply minus the instantaneous drops across elements 16, 32, and 34, appears across diode 18 which then breaks down and also conducts. A low impedance path through elements 16 and 18 and diodes 32, 34 to the B– terminal is thus provided to rapidly discharge capacitor 24. The voltage variation across the series circuit is indicated in FIGURE 3, while FIGURE 4 shows the corresponding output current pulses including sharp trailing edge portion 36 which produces cut-off upon reaching the minimum holding current level. The current pulses also appear as voltage output pulses at the transformer secondary winding 38. These output pulses can then be used to drive a utilization device such as a counting circuit to operate a stepping relay and motor.

After capacitor 24 has been discharged through the conduction path, diode 18 is returned to cut-off either by current limiting action of resistor 20 or by the reduction of current by the ringing circuit. The high impedance of diode 18 and resistor 26 then limit current through controlled rectifier 16 which ceases conducting. At the same time, the sharp negative voltage pulse, as shown in FIGURE 3, provides additional turn-off action by applying a reverse polarity potential across the series circuit. Thereafter, capacitor 24 commences to recharge through resistor 20 from the direct voltage supply, as shown by pulse waveform 40, and the cycle repeats.

Occurrence of a random pulse 42 or other malfunction during the period between the desired reply pulses cannot now trigger diode 18 into conduction since the charge on capacitor 24 has not built up sufficiently to apply the necessary anode-emitter amplitude across the diode 18 to cause breakdown and resistor 26 maintains the holding current of rectifier 16 below the minimum level. Thus, a dead time is introduced as the capacitor continues to charge. The cycle therefore continues normally with no output until a desired input pulse appears after the voltage has reached the necessary level. An increased switching or transition speed and reduction of time delay between trigger input and output pulses are effected by a positive feedback circuit from the secondary transformer winding through capacitor 44 to the input electrode 14. Resistor 46 at the input electrode provides a return path for leakage currents.

The effect that a random pulse would have, with the controlled rectifier 16 being connected directly to capacitor 24 without the series four-layer diode, is shown by dotted lines 48 of FIGURE 3 and dotted line 50 of FIGURE 4. In this instance controlled rectifier 16 would be triggered into conduction to prematurely discharge capacitor 24 but could not thereafter be reliably turned off since capacitor 24 has not been charged to a sufficient level to supply the reduction of current large enough to halt conduction, as previously described. The operation of the limiting resistor, which cannot be made too large because of frequency considerations when used only with the controlled rectifier, may then not be adequate without the proper action of the turn-off ringing circuit. The circuit would thus remain in a steady state "on" condition and would not properly actuate the utilization device. With the four-layer diode, however, the desired reliable switching is achieved. In some applications of this circuit as mentioned above, the use of the transformer to supply the ringing circuit negatively directed turn-off pulse is not essential. Output in a modified form of the circuit may then be taken from a resistor, which, for example, is arranged in series between diode 34 and the B– terminal. The disconnected lead of capacitor 24 can then effectively be grounded.

The numerical values and component parts of a representative circuit which was built are as follows:

| | |
|---|---|
| Resistors: | |
| 20 | 10K. |
| 26 | 470K. |
| 28 | 470K. |
| 30 | 22K. |
| 46 | 100K. |
| Capacitors: | |
| 12 | 470 mmfd. |
| 24 | .33 mfd. |
| 44 | 470 mmfd. |
| Four-layer diode 18 | 4E30M-28. |
| Controlled rectifier 16 | 2N885. |
| Diodes: | |
| 32 | 1N645. |
| 34 | 1N645. |
| Direct voltage supply: | |
| B+ | +25 v. |
| B– | –25 v. |

It may thus be seen that the present invention represents a novel switching circuit which provides a rapid, highly reliable self-extinguishing action for use as an effiicent control circuit. While only a single embodiment has been illustrated, it is apparent that the invention is not limited to the exact form or use shown and that many other variations may be made in the particular design and configuration without departing from the scope of the invention as set forth in the appended claims.

What is claimed is:

1. A control circuit comprising:

first semiconductor means having an avalanche voltage breakdown characteristic including a minimum current requirement for maintaining conduction after breakdown substantially independent of input signal, said means being extinguished when said current is reduced below said requirement;

second semiconductor means having an avalanche voltage breakdown characteristic connected in series with said first means for controlling the conduction and cut-off of said first and second series means, said second means having a higher minimum current requirement than said first means;

means to maintain said series means in a normally cut-off condition and to permit said second semiconductor to conduct at desired times;

input signal means coupled to said first semiconductor means to cause conduction of said series means at said desired times; and output means responsive to said input signal means and second means to supply an output signal when said first and second semiconductors are in the conducting state.

2. A control circuit comprising:

a first semiconductor switching means having an avalanche type characteristic including a predetermined voltage breakdown requirement to permit conduction and a minimum current requirement for maintaining conduction after breakdown substantially independent of signal voltage, said means being extinguished when said current is reduced below said requirement;

a second semiconductor switching means having an avalanche type characteristic connected in series with said first means, said second means having a predetermined potential requirement to permit conduction and a higher minimum current requirement than said first means for maintaining conduction so that said second means determines the conditions for conduction and cut-off of said series connected means;

means establishing predetermined operating potential and current levels to maintain said series connected means in a normally off condition and to permit conduction of said second means;

means to trigger said first means and cause conduction through said series connected means to form an output pulse when said voltage breakdown at said second means exceeds said requirement to permit conduction;

means to cause said series connected means to return to said normally off condition; and output pulse utilization means coupled to said series connected means.

3. The device of claim 2 wherein said first means comprises a silicon controlled rectifier having two electrodes in series and a gate electrode connected to one of said series electrodes and said second means comprises a two-terminal four-layer diode, said trigger means including means applying an input signal to said gate electrode.

4. A control circuit comprising:

a first semiconductor switching means having an avalanche type characteristic including a predetermined voltage breakdown requirement for establishing conduction and a minimum current requirement for maintaining conduction after breakdown substantially independent of input signal, said means being extinguished when said current is reduced below said requirement;

a second semiconductor switching means having an avalanche type characteristic connected in series with said first means, said second means having a predetermined voltage breakdown requirement for establishing conduction and a higher minimum current requirement than said first means for maintaining conduction so that said second means determines the conditions for conduction and cut-off of said series connected means;

means establishing predetermined operating potential and current levels to maintain said series connected means in a normally off condition;

means storing and applying a charging potential across said series connected means, said charging potential normally exceeding said voltage breakdown requirement of only said second means and being unable to establish the condition for conduction when below said voltage breakdown requirement;

input signal means for triggering said first means to permit said charging potential to initiate conduction through said series connected means to form a path for discharging said charging potential and permitting said series connected means to return to said normally off condition; and means coupled to said first and second series connected means supplying an outlet signal to contral a utilization device in accordance with the condition of said first and second means.

5. The device of claim 4 including threshold means connected in series with said first and second means to prevent conduction for input signals below a predetermined level.

6. The device of claim 5 wherein said first means comprises a silicon controlled rectifier having two electrodes in series and an input trigger electrode connected to one of said series electrodes and said second means comprises a two-terminal four-layer diode.

7. The device of claim 6 wherein said threshold means comprises a unidirectional conducting diode.

8. The device of claim 7 wherein said means establishing potential and current levels comprises a direct voltage source and a voltage divider resistor network connected across said source including a current limiting resistor connected in series with said first and second means.

9. The device of claim 8 wherein said charging potential means includes said limiting resistor connected between said second means and said direct voltage source, and a capacitor connector to the junction of said second means and resistor.

10. The device of claim 9 wherein said input signal means includes a source of pulses and said input trigger electrodes connected thereto.

11. The device of claim 10 wherein said charging potential means forms a ringing circuit for producing a current pulse through said series connected means having an amplitude sharply reduced from a maximum to limit and provide a positive cut-off of said conduction.

12. The device of claim 11 including feedback means connected between said output signal means and said input signal means to reduce the time of switching from said off condition to conduction.

References Cited by the Examiner

UNITED STATES PATENTS

| | | | |
|---|---|---|---|
| 2,946,899 | 7/60 | Day | 307—88.5 |
| 3,018,392 | 1/62 | Jones et al. | 307—88.5 |
| 3,048,710 | 8/62 | Shockley | 307—88.5 |
| 3,080,489 | 3/63 | White | 307—88.5 |
| 3,089,967 | 5/63 | Strull | 307—88.5 |
| 3,114,056 | 12/63 | Berge | 307—88.5 |

ARTHUR GAUSS, *Primary Examiner.*